(12) United States Patent
Curry et al.

(10) Patent No.: US 8,997,202 B2
(45) Date of Patent: Mar. 31, 2015

(54) SYSTEM FOR SECURE TRANSFER OF INFORMATION FROM AN INDUSTRIAL CONTROL SYSTEM NETWORK

(71) Applicant: Owl Computing Technologies, Inc., Ridgefield, CT (US)

(72) Inventors: John Curry, New River, AZ (US); Ronald Mraz, South Salem, NY (US)

(73) Assignee: Owl Computing Technologies, Inc., Ridgefield, CT (US)

( * ) Notice: Subject to any disclaimer, the term of this patent is extended or adjusted under 35 U.S.C. 154(b) by 0 days.

(21) Appl. No.: 13/707,082

(22) Filed: Dec. 6, 2012

(65) Prior Publication Data
US 2014/0165182 A1    Jun. 12, 2014

(51) Int. Cl.
*G06F 9/00* (2006.01)
*H04L 29/06* (2006.01)

(52) U.S. Cl.
CPC ........ *H04L 63/0281* (2013.01); *H04L 63/0209* (2013.01)
USPC .............. 726/12; 726/11; 713/153; 713/154; 709/238; 709/244

(58) Field of Classification Search
CPC .................. H04L 63/0281; H04L 63/0209
See application file for complete search history.

(56) References Cited

U.S. PATENT DOCUMENTS

| 5,703,562 | A  | * | 12/1997 | Nilsen ..................... 340/286.02 |
| 7,051,143 | B2 | * | 5/2006  | White et al. ................. 710/305 |
| 7,117,239 | B1 | * | 10/2006 | Hansen ......................... 709/200 |
| 7,992,209 | B1 | * | 8/2011  | Menoher et al. ............... 726/26 |
| 8,068,415 | B2 | * | 11/2011 | Mraz ............................. 370/230 |
| 8,219,214 | B1 | * | 7/2012  | Mimlitz ........................... 700/9 |
| 2005/0138432 | A1 | * | 6/2005 | Ransom et al. ............... 713/201 |
| 2007/0067458 | A1 | * | 3/2007 | Chand ........................... 709/226 |
| 2008/0109889 | A1 | * | 5/2008 | Bartels ............................ 726/7 |
| 2009/0182440 | A1 | * | 7/2009 | Kassou et al. ................... 700/7 |
| 2013/0139247 | A1 | * | 5/2013 | Cianfrocca .................... 726/14 |

* cited by examiner

*Primary Examiner* — Shewaye Gelagay
*Assistant Examiner* — Khoi Le
(74) *Attorney, Agent, or Firm* — John S. Economou

(57) ABSTRACT

A system for securely transferring information from an industrial control system network, including, within the secure domain, one or more remote terminal units coupled by a first network, one or more client computers coupled by a second network, and a send server coupled to the first and second networks. The send server acts as a proxy for communications between the client computers and the remote terminals and transmits first information from such communications on an output. The send server also transmits a poll request to a remote terminal unit via the first network and transmits second information received in response to the poll on the output. The system also includes, outside the secure domain, a receive server having an input coupled to the output of the send server via a one-way data link. The receive server receives and stores the first and second information provided via the input.

9 Claims, 5 Drawing Sheets

SYSTEM FOR SECURE TRANSFER OF INFORMATION FROM AN INDUSTRIAL CONTROL SYSTEM NETWORK

FIELD OF INVENTION

This invention relates generally to a system for the secure transfer of information from an industrial control system network, and in particular to a system for securely transferring information from a high integrity MODBUS network to a server on a non-secure remote network.

BACKGROUND OF THE INVENTION

MODBUS is a communications protocol published by Modicon in 1979 for use with programmable logic controllers (PLCs). Initially conceived as a serial communications link, more recent versions of the MODBUS protocol allow for communications over an Ethernet network using TCP/IP. Because it is simple and robust, MODBUS has since become a de facto standard communication protocol and is now one of the most commonly used means of connecting industrial electronic devices in industrial control systems (ICSs). For example, MODBUS is often used to connect a supervisory computer with one or more remote terminal units (RTUs) in supervisory control and data acquisition (SCADA) systems.

SCADA is one type of industrial control system (ICS). Industrial control systems are computer-controlled systems that monitor and control industrial processes that exist in the physical world. SCADA systems historically distinguish themselves from other ICS systems by being large scale processes that can include multiple sites, and large distances. These processes include industrial, infrastructure, and facility-based processes. Industrial processes include those of manufacturing, production, power generation, fabrication, and refining, and may run in continuous, batch, repetitive, or discrete modes. Infrastructure processes may be public or private, and include water treatment and distribution, wastewater collection and treatment, oil and gas pipelines, electrical power transmission and distribution, wind farms, civil defense siren systems, and large communication systems. Facility processes occur both in public facilities and private ones, including buildings, airports, ships, and space stations. They monitor and control HVAC, access, and energy consumption.

The security of SCADA and other ICS networks is important because compromise or destruction of these systems would impact multiple areas of society far removed from the original compromise. However, the move from proprietary technologies to more standardized and open solutions together with the increased number of connections between segregated control networks and office networks and the Internet has made such control networks more vulnerable to cyber-attack. There are two distinct threats to a modern segregated control network. The first threat is unauthorized access to the control software via changes induced intentionally or accidentally by virus infections and other software threats residing on the control host machine. The second threat is packet access to the network segments hosting SCADA devices. In many cases, there is rudimentary or no security on the actual packet control protocol, so anyone who can send packets to the SCADA device can control it. In many cases SCADA users assume that a VPN is sufficient protection and are unaware that physical access to SCADA-related network jacks and switches provides the ability to totally bypass all security on the control software and fully control those SCADA networks. These kinds of physical access attacks bypass firewall and VPN security and are best addressed by endpoint-to-endpoint authentication and authorization such as are commonly provided in the non-SCADA world by in-device SSL or other cryptographic techniques. The reliable function of SCADA systems in our modern infrastructure may be crucial to public health and safety. As such, attacks on these systems may directly or indirectly threaten public health and safety. Thus, there is a great motivation to maintain SCADA and other ICS networks secure by physically preventing any unauthorized access to such networks. The easiest way to do this is ensure that there is no interconnection whatsoever to any remote networks. However, often there is a need to transfer information from the secure SCADA or other ICS network to a non-secure location, e.g., a historian database on a remote network. Thus there is a conflict between providing the best level of security and transferring information to the remote network. This is because the transfer of information will typically require a two-way interface, and because such two-way interface could provide easy access for an external cyber-attack.

Highly engineered solutions, such as the Owl Computing Technologies Dual Diode, (described in U.S. Pat. No. 8,068, 415, the disclosure of which is incorporated herein by reference) provide a one-way data link in the form of a direct point-to-point optical link between network domains in the low-to-high direction or in the low-to-high direction. The unidirectionality of the data transfer is enforced in the circuitry of the network interface cards at both network endpoints and in the cable interconnects. In this way, the hardware provides an added layer of assurance of unidirectional information flow and non-bypassable operation. In contrast to software based one-way data transfer systems, it is easy to prove that data is not bypassing the Dual Diode.

In such systems, shown in block diagram form in FIG. 1, a first server (the Blue Server) 101 includes a transmit application 102 for sending data across a one-way data link, e.g., optical link 104, from a first network domain coupled to server 101 to a second network domain coupled to server 111. First server 101 also includes a transmit (here a phototransmission) component, e.g., optical emitter 103. Transmit application 102 provides data to the optical emitter for transmission across the optical link 104. A second server (the Red Server) 111 includes a receive (here a photodetection) component, e.g., optical detector 113, for receiving data from the optical link 104, which data is then provided to the receive application 112 for further processing. The first server 101 is only able to transmit data to second server 111, since it does not include any receive circuitry (e.g., an optical detector comparable to detector 113) and the second server 11 is only able to receive data from first server 101, since it does not include any transmit circuitry (e.g., an optical emitter comparable to emitter 103).

FIG. 2 shows a conventional MODBUS-based industrial control system 200. A computer 210 running SCADA software 220 communicates via a MODBUS TCP/IP driver 225 with a series of MODBUS-enabled devices 241 to 244 over the plant process computer network 230 (e.g., an Ethernet network). Some of the MODBUS-enabled devices (i.e., device 243 in FIG. 2) may contain multiple slaves devices 261, 262 coupled via a sub-network 250. This type of system 200 can be vulnerable to both types of threats discussed above, i.e., unauthorized access to the control software and packet access to the network segments.

It is an object of the present invention to provide a secure way to transfer information from an ICS network while maintaining the integrity of network to ensure protection from remote cyber-attack.

SUMMARY OF THE INVENTION

The present invention provides a system for securely transferring information from a first network positioned within a secure domain. In a first embodiment, the system includes, within the secure domain, one or more remote terminal units, a first network coupling the one or more remote terminal units, one or more client computers, a second network coupling the one or more client computers and a send server coupled to the first network and to the second network. The send server has an output and is configured to act as a proxy for communications between at least one of the one or more client computers and at least one of the one or more remote terminals, to store first information provided by the at least one of the one or more remote terminals, and to transmit the stored first information on the output. The send server is also configured to transmit a poll request to at least one of the one or more remote terminal units via the first network, to store second information supplied on the first network in response to the poll request, and to transmit the second information on the output. The system also includes, outside the secure domain, a receive server having an input coupled to the output of the send server via a data link which allows communication only from the send server to the receive server. The receive server is configured to receive and store the first and second information provided via the input.

In a second aspect, the system includes, within the secure domain, one or more remote terminal units, a first network coupling the one or more remote terminal units, one or more client computers, a second network coupling the one or more client computers and a send server and coupled to the first network and to the second network. The send server has an output and is configured to act as a proxy for communications between at least one of the one or more client computers and at least one of the one or more remote terminals, to store information provided by the at least one of the one or more remote terminals, and to transmit the stored information on the output. The system also includes, outside the secure domain, a receive server having an input coupled to the output of the send server via a data link which allows communication only from the send server to the receive server. The receive server is configured to receive and store the information provided via the input.

In a third aspect, the system includes, within the secure domain, one or more remote terminal units, a first network coupling the one or more remote terminal units, and a send server coupled to the first network. The send server has an output and is configured to transmit a poll request to at least one of the one or more remote terminal units via the first network, to read information supplied on the first network in response to the poll request, and to transmit the read information on the output. The system also includes a receive server outside the secure domain having an input coupled to the output of the send server via a data link which allows communication only from the send server to the receive server and which is configured to receive and store the information provided via the input.

Preferably, the system may include, outside the secure domain, a third network coupled to the receive server and one or more client computers coupled to the third network, with the receive server further configured to provide at least part of the stored information in response to a request from one of the one or more client computers via the third network. Preferably, each of the remote terminal units is a MODBUS device or a MODBUS PLC. Preferably, the first and second networks are part of an industrial control system.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF THE PREFERRED EMBODIMENTS

In the present disclosure, like reference numbers refer to like elements throughout the drawings, which illustrate various exemplary embodiments of the presently disclosed system. Although the presently disclosed system will be discussed with reference to various illustrated examples, these examples should not be read to limit the broader spirit and scope of the present invention.

Figure 1:
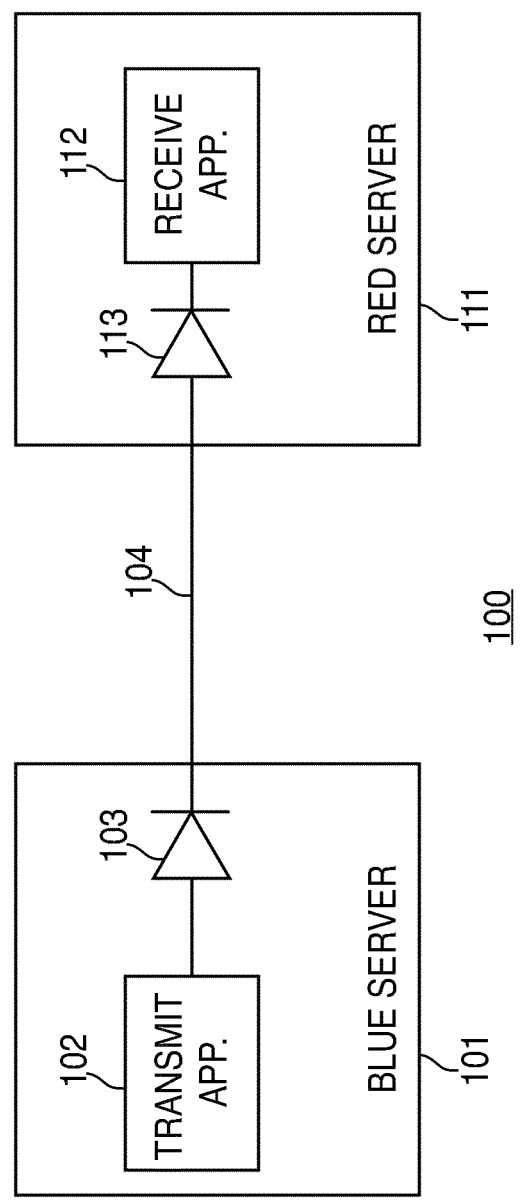
FIG. 1 is a block diagram of a conventional one-way data transfer system.

The system disclosed herein captures MODBUS data present within a secure network and then passes that data into a non-secure area using a one-way data link, e.g., the OWL Dual Diode Technology shown in FIG. 1. In a first aspect, the system monitors existing MODBUS Master/Slave communications to collect the MODBUS data. In a second aspect, communication is directly with a MODBUS enabled device. In either aspect, the MODBUS data is collected within the secure environment and made available to customer client applications requiring MODBUS data which are positioned remotely, e.g., in a non-secure environment, without any communication whatsoever from the non-secure environment to the secure environment. In this manner, communication of information out of the is provided without any possibility of compromise of the secure environment. The system disclosed herein is very flexible, enabling a number of different configurations, each of allows information to be transmitted from the plant process computer network to outside the secure boundary without any breach of the security of that network. Existing systems can be modified to add the system disclosed herein to existing servers, or new servers may be added to handle the additional PLC and Dual Diode communications.

Figure 3:
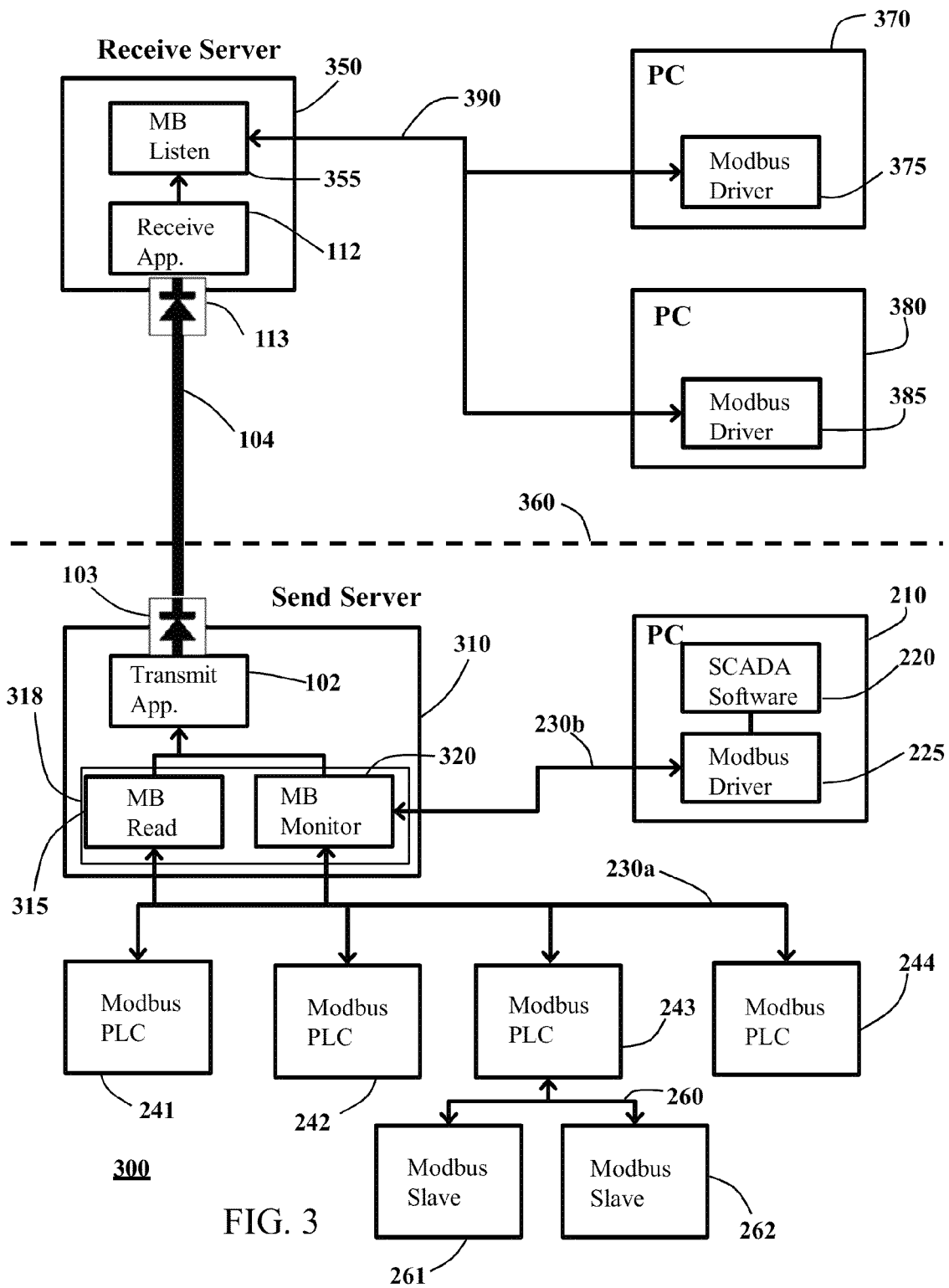
FIG. 3 is a block diagram of a secure information transfer system for a MODBUS-based industrial control system according to the present invention.

FIG. 3 shows an implementation of the entire system 300, including a send server 310 positioned within the secure portion of the industrial control system network (i.e., the area below dotted line 360) and a receive server 350 positioned outside the secure area (i.e., the area above dotted line 360). Send server 310 is coupled to receive server 350 via a one-way data link consisting of, for example, transmit application 102, optical emitter 103, optical link 105, optical detector 113 and receive application 112. The one-way data link preferably operates in a manner identical to the Dual Diode circuit shown in FIG. 1 and described above, although one of ordinary skill in the art will readily recognize that other one-way data links may be provided to link send server 310 to receive server 350 within the scope of the present invention.

Figure 4:
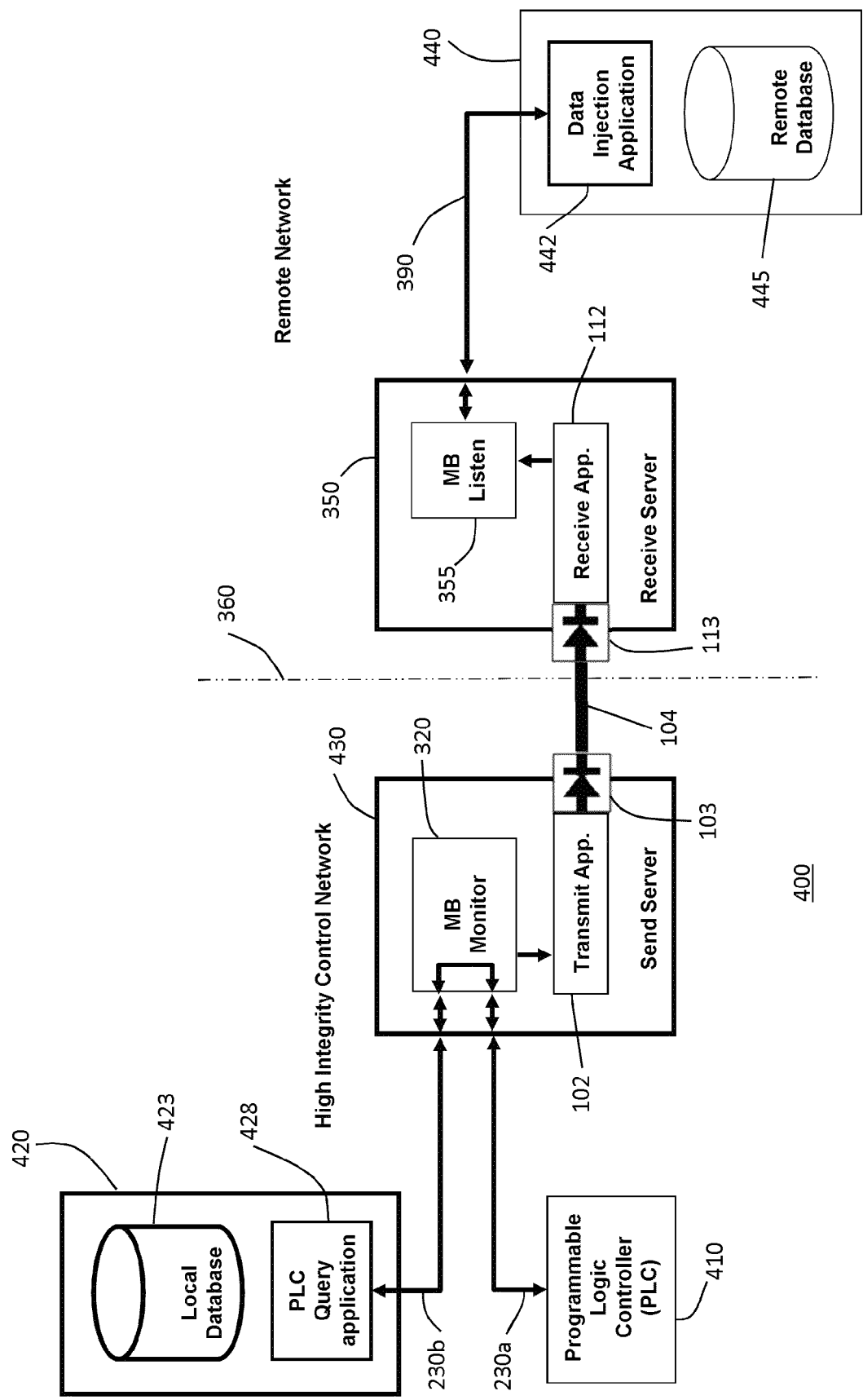
FIG. 4 is a block diagram of the secure information transfer system for a MODBUS-based industrial control system of the present invention showing a first aspect thereof.

The send server 310 performs the physical communications with the field MODBUS PLC devices 241-244. Although only MODBUS PLC devices are shown in FIG. 3, one of ordinary skill in the art will readily recognize that any MODBUS device, e.g., a non-PLC device having a MODBUS I/O interface, can communicate on the actual MODBUS network 230a. Send server 310 includes a MODBUS communication software interface 318 having two separate modes of operation, i.e., operations separately performed by MB read module 315 and MB monitor module 320. The modules 315, 320 are preferably provided as part of application software operating on send server 310, but as one of ordinary skill in the art will readily recognize, may also be provided in part in software and in part in hardware, or completely in hardware. The two modules 315 and 320 may be implemented together in a single system based on the settings in the configuration file in send server 310, as shown in FIG. 3, or may be separately implemented, as shown in FIG. 4 (which only includes the MB monitor module 320) and in FIG. 5 (which only includes MB read module 315).

Figure 2:
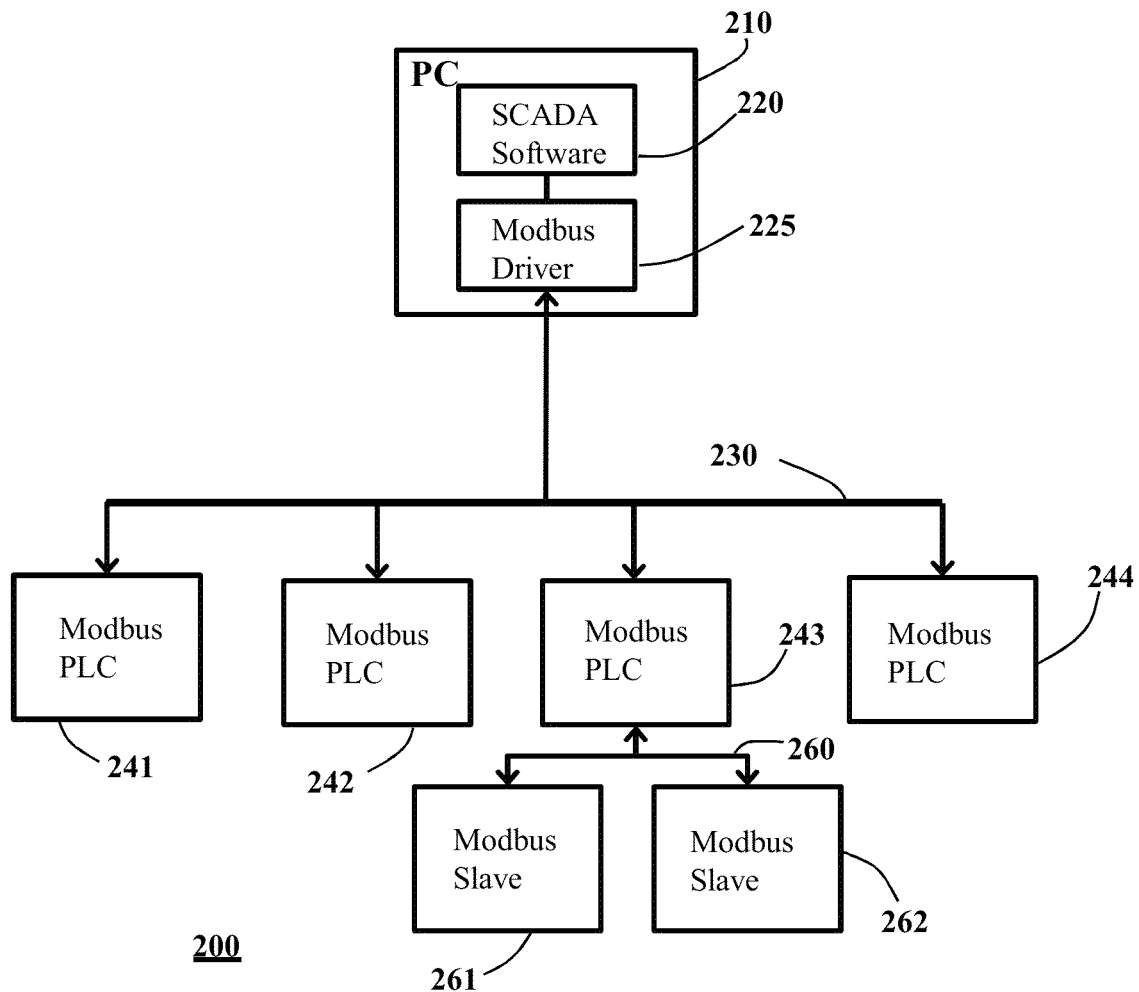
FIG. 2 is block diagram of a conventional MODBUS-based industrial control system.

To enable the MB monitor mode, the send server 310 is positioned between a computer 210 running SCADA software 220 and the MODBUS devices 241-244. In particular, as shown in FIG. 3, the MB monitor module 320 separates the conventional network 230 of FIG. 2 into two parts, a first network 230a directly coupling the MODBUS devices 241-244 with a first connection to the MB monitor module 320 in send server 310 and a second network 230b directly coupling computer 210 with a second connection to the MB monitor module 320 in send server 310 (via the conventional MODBUS driver 225 within client computer 210). MODBUS devices often support concurrent access, and many end user configurations take advantage of this feature. For example, an end user may have multiple computers communicating on the network 230 of FIG. 2, each of which is accessing the same MODBUS device using the same IP address and port. Each of these computers may request the same information or different information. The system disclosed herein supports this type of configuration by accepting multiple connections on its assigned port, and acting as a gateway to the physical MODBUS device (i.e., there may be a plurality of computers 210 coupled to network 230b). In the configuration shown in FIG. 3, all pertinent data flowing to or from a MODBUS device on network 230a can be identified and collected in MB monitor 320. The data collected can then be made available to receive server 350 and its clients, e.g., computers 370, 380, via the one-way data link In operation, the MB read module 325 actively polls each MODBUS device in a predefined manner, and then sends the information received as a result of such polling to the receive server 350 across the one-way data link.

The MODBUS interface 318 is controlled by a configuration file, which includes three parts: (1) an MB Options section; (2) an MB Read section; and (3) an MB Monitor section. The MB Options section defines the type of server, i.e., send or receive, and the address and port number of the UDP address for communications from send server 310 to receive server 350. An example of the actual code portion for the MB Options section is shown below:

```
# MODBUS Configuration File

```

-continued

```
[OPTIONS]                          ;Main options section
OPT_SEND      TRUE                 ;This is the Talker (Blue)
OPT_UDP_ADDR 192.168.100.69        ;This is the OWL UDP address
OPT_UDP_PORT 11500                 ;This is the OWL UDP Port
```

Note that in all code portions shown herein, lines beginning with the character '#' are comment lines. The [OPTIONS] header defines the options section of the configuration file. The OPT_SEND line tells the MODBUS interface 318 to act as the send server (when "TRUE" as shown above). The send server is the only server allowed to directly communicate with the MODBUS devices 241-244. The OPT_UDP_ADDR and OPT_UDP_PORT lines define the UDP address and port number used to communicate to the receive server 350. A single UDP connection (i.e., the one-way link defined, in part, by optical link 104 in FIG. 3) is used to pass all data from the send server to the receive server.

The MB Read section of the configuration file describes the entries in the configuration file on the send server required for each MODBUS device being polled directly. In operation, the MB Read module within the send server polls each defined device and then immediately sends the poll results to the receive server across the one-way data link. An example of the actual code portion for the MB Read section is shown below:

```

# PLC definition block

[PLCTEST Number 1]              ;This can be any label that is
                                 meaningful to the client
MODE Send                       ;We are the MODBUS Master, talking
                                 to this PLC
PLC_RXTIMEOUT   3               ;Wait 3 seconds for response from
                                 PLC (default is 5)
IP_OUT       192.168.100.10     ;IP address of the PLC
PORT_OUT            502         ;Port address of the PLC

# POLL_COMMAND: Starting_Address Number_Of_Words
MODBUS_Command PLC_Addr scan_time [transaction_ID]
[Protocol_ID]

POLL_COMMAND    0   5    4    1    .1
POLL_COMMAND    5   10   4    1    .1
POLL_COMMAND   15   10   4    1    .1
POLL_COMMAND   10   20   3    1    .1
POLL_COMMAND    0    6   2    1    .1
POLL_COMMAND   16   16   2    1    .1
POLL_COMMAND   32   16   2    1    .1
POLL_COMMAND   20   10   4    2    .1    For RTU # 2
POLL_COMMAND    0    5   4    2    .1    For RTU # 2
POLL_COMMAND   20   10   4    2    .1    For RTU # 2
POLL_COMMAND    0   32   2    2    .1    For RTU # 2
POLL_COMMAND   40   18   2    2    .1    For RTU # 2
```

The command line labeled "[PLCTEST Number 1]" defines the start of a MODBUS device definition block. All information that follows is treated as information for a single MODBUS device.

The "MODE Send" command line shown above sets the send server 310 to act as a polling master, collecting data as defined by the listed Poll commands and then send the collected data over the one-way data link to the receive server 350. All of the collected Poll Record data is refreshed to the receive server 350 at fixed intervals, preferably every thirty seconds. However, whenever a poll is executed, the data received is sent immediately to the receive server 350, and, if the poll fails, the fail status for the poll record is also sent immediately to receive server 350. If communications with the PLC itself fails, all poll records are marked as FAILED and sent immediately to the receive server 350.

The "PLC RX Timeout" command line shown above sets the amount of time that that the MB Read module 315 will wait for a MODBUS device 241-244 to respond to a poll command. If no response is received within the given time frame, then that particular poll record is deemed FAILED and its status is sent immediately to the receive server 350.

The "IP_OUT" and "PORT_OUT" command lines identify the physical address and port number, respectively, for the particular MODBUS device for which commands are being defined.

The poll commands ("POLL_COMMANDS") command lines for each MODBUS device consist of the command type, starting address, number of words, scan rate, and, optionally, the transaction ID and the Protocol ID, if needed. The poll records for a given MODBUS device are specified in the configuration file for the send server 310 and in the configuration file for the receive server 350 (as discussed below). The following command types are preferably provided for the direct polling of a MODBUS Device:

| Command Number | Description | MODBUS Registers |
|---|---|---|
| 1 | Read Coil Status | 00001 - |
| 2 | Read Input Status | 10001 - |
| 3 | Read Holding Register | 40001 - |
| 4 | Read Input Register | 30001 - |

The starting address for a poll record is '0' based. As shown above, the poll command includes: (1) Starting_Address; (2) Number_Of_Words; (3) MODBUS_Command; (4) PLC_Addr; (5) scan_time; (6) transaction_ID (optional); and (7) Protocol_ID (optional). The following is an example of a poll command:

| POLL_COMMAND | 10 | 20 | 3 | 1 | .1 |
|---|---|---|---|---|---|

This poll command starts at the 0 based address of 10, for 20 additional words, reading the Holding Registers (command 3) from slave address (PLC addr.) 1 at 0.1 second intervals. So, the read starts at MODBUS register 40011, and continues for 20 consecutive addresses. Preferably, the scan time can be specified as any number of seconds. Preferably, the minimum scan time is 0.1 seconds. In addition, a given MODBUS TCP/IP address can have multiple slave addresses and thus all poll records required for a slave device (e.g., MODBUS slave devices 261, 262 in FIG. 3) are also included in this section.

The MB Monitor section of in the configuration file for the send server 310 identifies the MODBUS devices which are being monitored. The MB monitor module 320 monitors the data flowing between the device (e.g., MODBUS PLC 241 in FIG. 3) and computer 210, identifies the data of interest (as specified in the configuration file), and immediately sends the identified data to the receive server 350. In operation, the MB monitor module 320 in the receive server 310 acts as a proxy for the connection between a MODBUS device, e.g., MODBUS PCL 241 and computer 210. The MODBUS commands issued by the MODBUS driver 225 in computer 210 are intercepted by the MB monitor module 320, since MODBUS driver 225 is only coupled to MB monitor 320 via network 230b. The intercepted MODBUS commands are then relayed to the appropriate MODBUS PLC via network 230a. MB monitor module 320 will then receive (on network 230a) any response made by the MODBUS PLC to such command, and then echo such response back to MODBUS driver 225 on computer 210 via network 230b.

In operation, a user may either pre-define the information (poll records) to be captured or let the MB monitor module 320 capture all the poll records issued by the MODBUS client and dynamically generate the poll list. Preferably, the two modes are not mixed, either all poll records are statically pre-defined or all poll records are dynamically generated.

For dynamic poll generation, no poll records are defined in the configuration file. Instead, poll records are captured from the MODBUS client and the poll record definition is sent to MB listen module 355 on receive server 350. In operation, each command type being issued is examined at the MB monitor module 320 and, if it is a command of interest, (e.g., MODBUS command 1, 2, 3, or 4 as identified above), then the poll records captured for the associated MODBUS PLC up to that pointe are examined. If the poll record/slave number does not match an existing poll record, then a new poll record is dynamically created and the new poll record definition is sent to MB listen module 355 on receive server 350.

For static poll record definition, all poll records are defined in the configuration file. The MB monitor module 320 looks at the command type being issued. If it is a command of interest (e.g., one of MODBUS command 1, 2, 3, or 4) then the poll records in the configuration file for this MODBUS device are examined. If the poll record/slave number matches one of the defined poll records, then the poll records are updated with the response from the MODBUS device. Note that the poll records defined in the configuration file do not have to exactly match the poll commands as issued by the MODBUS TCP/IP driver on the client computer 210. The MB monitor module may do a partial poll record update of the local poll record database by extracting pertinent data from the MODBUS communications stream.

The following provides an example of the MB Monitor Configuration File portion:

```
[PLCTEST Number 2]            ;This can be any label that is
                              meaningful to the client
MODE Monitor                  ;We are Monitoring transactions to
                              this PLC
PLC_RXTIMEOUT    3            ;Wait 3 seconds for response from
                              PLC (default is 5)
IP_OUT     192.168.100.13     ;IP address of the PLC
PORT_OUT   502                ;Port address of the PLC
IP_IN      192.168.100.113    ;IP address to listen on
PORT_IN    502                ;Port address to listen on
POLL_DYNAMIC    FALSE         ;Dynamic Poll generation disabled

# POLL_MONITOR: Starting_Address Number_Of_Words
MODBUS_Command PLC_Addr [transaction_ID]
[Protocol_ID]

POLL_MONITOR          0   5    4    1
POLL_MONITOR          5   10   4    1
POLL_MONITOR         15   10   4    1
POLL_MONITOR         10   20   3    1
POLL_MONITOR          0   16   2    1
POLL_MONITOR         16   16   2    1
POLL_MONITOR         32   16   2    1
POLL_MONITOR         20   10   4    2    For RTU # 2
POLL_MONITOR          0   5    4    2    For RTU # 2
POLL_MONITOR         20   10   4    2    For RTU # 2
POLL_MONITOR          0   32   2    2
POLL_MONITOR         40   18   2    2
```

The line "[PLCTEST Number 2]" defines the start of a MODBUS definition block. All information that follows this line is treated as information for the same PLC or other MODBUS device.

The line "MODE Monitor" instructs the MB monitor module 320 to monitor an existing MODBUS connection. As discussed above, MB monitor module 320, when enabled, acts as a proxy by receiving MODBUS commands from the computer 210 and then passing those commands directly to the physical MODBUS device 241-244 via network 230*a*. In operation, MB monitor module 320 collects data as defined by the poll commands, and sends it over the one-way data link to the receive server 350. Preferably, all poll record data is refreshed to receive server 350 every thirty seconds. However, whenever a poll is executed, data obtained in response to that poll command is sent immediately to receive server 350 and, if the poll command fails, the fail status for the poll record is also sent immediately to receive server 350. If communications with the same PLC or MODBUS device fails, all poll records are marked as FAILED and sent immediately to receive server 350.

The line "PLC RX Timeout" sets the amount of time that to wait for polled MODBUS device to respond. If no response is received within the designated time frame, then that particular poll record is deemed FAILED and that status is sent immediately to receive server 350.

The lines "IP_OUT" and "PORT_OUT" set the physical address and port number, respectively, for the PLC or MODBUS device.

The line "POLL_DYNAMIC" enables or disables the dynamic poll record generation feature. If the value is FALSE, then poll records will not be generated dynamically, and poll record definitions must be included in the configuration file. If the value is TRUE, then poll record definitions are captured from the client as they occur and also sent to the MB listen module 355 on receive server 350.

The lines "IP_IN" and "PORT_IN" set the physical address and port number, respectively, for communication with the MODBUS driver 225 in computer 210 (i.e., the proxy address for the associated MODBUS device).

If dynamic poll generation is used, then no poll records (i.e., the "POLL_MONITOR" lines shown above) are defined in the configuration file for the particular MODBUS device. However, if static poll definition is in use, then each poll record must be defined. The poll commands for a particular MODBUS device consist of command type, starting address, number of words, and, optionally, the transaction ID and the Protocol ID if needed for the MODBUS device. Note that no scan rate is defined, because the scan rate is controlled by the poll commands as issued by the MODBUS driver 225 on the computer 210. The poll records for a particular MODBUS device are specified in the configuration file for the send server 310 and in the configuration file for the receive server 350, and must match. Note that the following command types are used for monitoring of a MODBUS device:

| Command Number | Description | MODBUS Registers |
|---|---|---|
| 1 | Read Coil Status | 00001 - |
| 2 | Read Input Status | 10001 - |
| 3 | Read Holding Register | 40001 - |
| 4 | Read Input Register | 30001 - |

The starting address for a poll record is '0' based. As shown above, the poll command includes: (1) Starting_Address; (2) Number_Of_Words; (3) MODBUS_Command; (4) PLC_Addr; (5) transaction_ID (optional); and (6) Protocol_ID (optional). The following is an example of a poll command:

| POLL_MONITOR | 10 | 20 | 3 | 1 |
|---|---|---|---|---|

This poll command starts at the 0 based address of 10, for 20 additional words, reading the Holding Registers (command 3) from slave address (PLC addr.) 1. Whenever the MODBUS driver 225 in computer 210 issues a command, a check is made to see if any of the requested data intersects with any of the defined poll records. If it does, then that portion of the poll record is updated with the data coming back from the PLC. Note that a given MODBUS TCP/IP address can have multiple slave addresses. All poll records required for a slave must be included in this section. For example, in the configuration file shown above, one slave is polled at slave address 1, and another slave is polled at slave address 2.

Receive server 350 in FIG. 3 receives MODBUS poll record data from send server 320, and makes that data available to MODBUS drivers 375, 385 in respective client computers 370, 380. The only data that is made available to the client computers 370, 380 is the data defined in the poll records. The poll records and the physical MODBUS devices themselves are defined in a configuration file that is read by the MB listen module 355 in receive server 350 upon startup. As discussed above, information defining the status of each poll record and the status of the MODBUS devices is fed forward to receive server 350 from send server 310. If a poll record is in the FAILED state, then the respective client computer 370, 380 will not receive a response to a request. All poll record data is forced from send server 310 to receive server 350 at fixed (preferably 30 second) intervals. In this way, the poll record data on receive server 350 can be assured to be accurate.

For poll record definition at receive server 350, the user has an option of statically defining the poll records to be monitored or letting the MB listen module 355 dynamically generating the poll list by capturing the poll records issued by the MODBUS client. As evident based on the one-way data link coupling send server 310 to receive server 355, and the lack of a link allowing any information to pass from receive server 355 to send server 310, the MB listen module can only operate in a LISTEN mode and does not have any ability to communicate directly with any of the physical MODBUS devices 241-244.

The MB listen module 355 is controlled by a configuration file, which is shown below in two segments for ease of discussion. The first OPTIONS Section includes the following:

```
# MODBUS Configuration File

[OPTIONS]                            ;Main options section
OPT_LISTEN      TRUE                 ;This is the listener (Red)
OPT_UDP_ADDR    192.168.100.69       ;This is the OWL UDP address
OPT_UDP_PORT    11500                ;This is the OWL UDP Port
OPT_UDP_TIMEOUT 30                   ;Inactivity timeout for UDP.
```

The "[OPTIONS]" line defines the options section of the configuration file. The "OP_LISTEN" line indicates that the installed software should operate as an MB listen module 355 on a receive server. The lines "OPT_UDP_ADDR" and "OPT_UDP_PORT" designate the UDP address and port number, respectively, used to collect data from the send server 310. A single UDP connection is used to pass all data from send server 310 to receive server 350. The "OPT_UDP_TIMEOUT" line defines the deadman timeout for the UDP connection between send server 310 and receive server 350. If receive server 350 does not receive any data from send server 310 within this timeout period, then all MODBUS devices 241-244 coupled to receive server 350 via send server 310 are deemed failed. The "PLC Listen Mode" line describes the entries in the configuration file on receive server 350 for a designated MODBUS device. Send server 310 polls the data and immediately sends the poll results to receive server 350. The polling data is then made available to client computers connected to receive server 350 (e.g., computers 370, 380 shown in FIG. 3). As evident, the listen mode is the only mode supported at receive server 350.

The second MB Listen portion of the configuration file is shown below:

```
PLC LISTEN Configuration File Entry
[PLCTEST Number 2]              ;This can be any label that is
                                 meaningful to the client
MODE Listen                      ;We are LISTENING for data across
                                 the diode
IP_IN           192.168.100.113  ;Clients talk to me on
                                 this address
PORT_IN         502              ; Clients talk to me on this port
PLC_DIAGREGISTERS    5000        ;Start of diagnostic registers for
                                 this PLC
POLL_DYNAMIC    FALSE            ;Dynamic Poll generation disabled

# POLL_MONITOR: Starting_Address Number_Of_Words
MODBUS_Command PLC_Addr [transaction_ID]
[Protocol_ID]

POLL_MONITOR    0      5      4   1
POLL_MONITOR    5      10     4   1
POLL_MONITOR    15     10     4   1
POLL_MONITOR    10     20     3   1
POLL_MONITOR    0      16     2   1
POLL_MONITOR    16     16     2   1
POLL_MONITOR    32     16     2   1
POLL_MONITOR    20     10     4   2      For RTU #2
POLL_MONITOR    0      5      4   2      For RTU #2
POLL_MONITOR    20     10     4   2      For RTU #2
POLL_MONITOR    0      32     2   2
POLL_MONITOR    40     18     2   2
POLL_MONITOR    5000   250    3   1      ;For Diagnostics
```

The "[PLCTEST Number 2]" line defines the start of a MODBUS definition block. All information that follows is treated as information for the same PLC or MODBUS device. The text between the brackets must be unique from the other PLC blocks in the configuration file, and it must match the name used for this PLC on send server 350.

The "MODE Listen" line tells the software loaded in the receive server 350 to act as a MB listen module 355. As discussed herein, the MB listen module 355 listens for data from send server 310 for the identified MODBUS device and acts as a proxy by receiving MODBUS commands from MODBUS drivers on client computers (e.g., MODBUS drivers 375, 385 on computers 370, 380) and then responding to those commands with data received from send server 310. All poll record data is refreshed to the receive server at a fixed interval, e.g., every thirty seconds, from send server 310.

The "IP_IN" and "PORT_IN" lines identify the proxy address and port number, respectively that MODBUS drivers 375, 385 use for talking to the PLC (actually with receive server 350 as a proxy for the PLC).

The "PLC_DIAGREGISTERS" is an optional entry used to define a series of registers that can be accessed by client computers 370, 380 to determine the status of a particular PLC and each of the poll records defined for that PLC. If this option is implemented, then there must be a corresponding poll record included in the poll definitions for the diagnostic registers. The address used can be any address between 1 and 60000. Note that the address used must not overlap any other poll record addresses for the selected PLC. The number of addresses actually used is dependent upon the number of poll records defined. For each poll record defined, 6 contiguous registers are required. In sample configuration shown above, the diagnostic registers start at location 5000. A client computer may can access diagnostic information starting at address 5000, with the layout of that information as follows:

| Address | Definition |
| --- | --- |
| 5000 | 0: PLC Failed, 1: PLC in service |
| 5001 | # of poll records in the system |
| 5002 | Poll record 1: Starting Address |
| 5003 | Poll record 1: slave address |
| 5004 | Poll record 1: MODBUS function code |
| 5005 | Poll record 1: # of messages received |
| 5006 | Poll record 1: Elapsed seconds since last receive |
| 5007 | Poll record 1: 0 = Poll record failed, 1 = Poll record OK |
| 5008 | Poll record 2: Starting Address |
| 5009 | Poll record 2: slave address |
| 5010 | Poll record 2: MODBUS function code |
| 5011 | Poll record 2: # of messages received |
| 5012 | Poll record 2: Elapsed seconds since last receive |
| 5013 | Poll record 2: 0 = Poll record failed, 1 = Poll record OK |

The "POLL_DYNAMIC" field enables or disables the dynamic poll record generation feature. If the value is FALSE, then poll records will not be generated dynamically, and a user must place the poll record definitions into the configuration file. If the value is TRUE, then poll record definitions are captured from the client computer 370, 380 in real time, and sent to the MB listen module 355 on receive server 350. Receive server 350 then maintains a dynamic list of poll record definitions as captured from send server 310.

The "Poll Monitor Definitions" are only used with static poll definition since each poll record must be statically defined. Poll commands for a MODBUS device consist of the command type, starting address, number of words, and, optionally, the transaction ID and the Protocol ID if needed for the device. No scan rate is defined because the scan rate is controlled by the rate at which data is collected on send server 310. The poll records for a given MODBUS device are specified in the configuration file for send server 310 and in the configuration file for receive server 350 (and must match).

The following command types are preferably supported for monitoring of a MODBUS device:

| Command Number | Description | MODBUS Registers |
| --- | --- | --- |
| 1 | Read Coil Status | 00001 - |
| 2 | Read Input Status | 10001 - |
| 3 | Read Holding Register | 40001 - |
| 4 | Read Input Register | 30001 - |

The starting address for a poll record is '0' based. As shown above, the poll command includes: (1) Starting_Address; (2) Number_Of_Words; (3) MODBUS_Command; and (4) PLC_Addr. The following is an example of a poll command:

```
POLL_MONITOR         10      20      3      1
```

This poll command starts at the 0 based address of 10, for 20 additional words, reading the Holding Registers (command 3) from slave address (PLC addr.) 1. Whenever a MODBUS driver 375, 385 in a client computer 370, 380 issues a command, a check is made to see if all of the requested data intersects with the defined poll records. If it does, then the customer request is serviced with the data available in the poll record database. If any of the poll records are in the FAILED state, receive server 350 will not respond to the client request, thus simulating a MODBUS device failure. If the client computer 370, 380 requests an address that is not contained in any of the poll records, the MB listen module 355 will respond to the client computer 370, 380 with a standard "MODBUS illegal address" error code.

Figure 5:
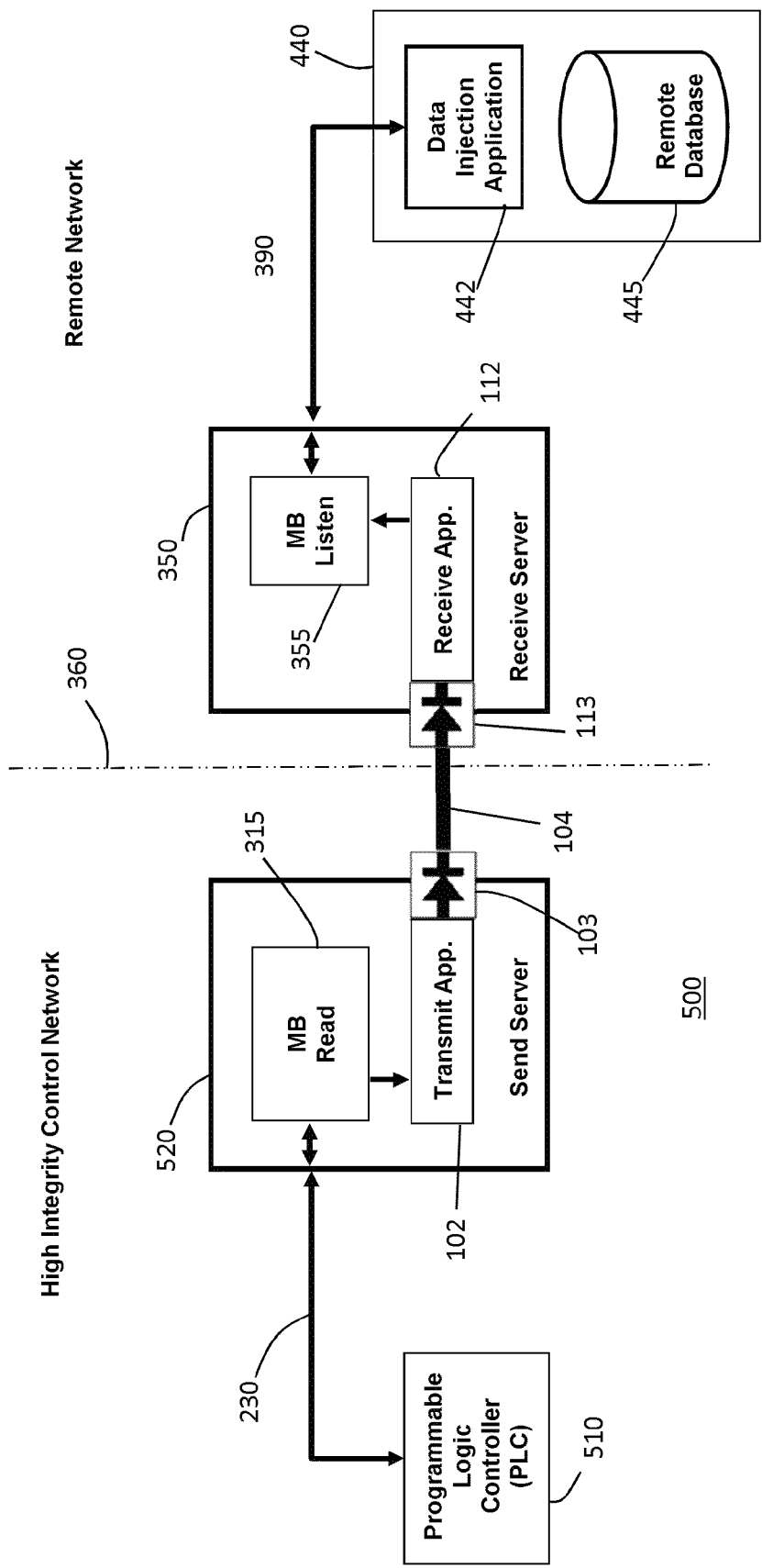
FIG. 5 is a block diagram of the secure information transfer system for a MODBUS-based industrial control system of the present invention showing a second aspect thereof.

As discussed above, the system of FIG. 3 provides two different modes of operation: (1) monitoring communications within a secure area between a local computer 210 and a local MODBUS PLC device and sending data from such communications to a remote computer (e.g., computer 370) outside the secure area; and (2) directly reading information from a MODBUS PLC device within the secure area and sending the information read to a remote computer (e.g., computer 380) outside the secure area. These two modes may be implemented together in a single system, as shown in FIG. 3, or separately, as shown in FIGS. 4 and 5. Both modes provide for the transmission of information from a secure area to a non-secure remote computer outside the secure area while maintaining the security of the secure area based on the one-way data link used for transmission of the information outside the secure area.

FIG. 4 shows an implementation 400 based only on the first mode of operation. In FIG. 4, a MODBUS PLC 410 is coupled to a local computer 420 via a local network 230 having a first portion 230a and a second portion 230b, the two portions separate. Local computer 420 includes a PLC query application 428 and a local database 423 for storing information obtained from PLC 410. Local computer 420 and PLC 410 are within a secure area (e.g., a high integrity control network) shown in FIG. 4 as the area to the right of dotted line 360. The area to the left of dotted line 360 is considered the remote portion outside the secure area. Send server 430 is also positioned within the secure area and includes a configuration file enabling MB monitor module 320. MB monitor module is separately coupled to network 230a and to network 230b. MB monitor module 320 monitor communications between PLC 410 and computer 420 and, as discussed above, based on the poll records stored in the configuration file (generated either statically or dynamically), information of interest is captured and provided to the MB listen module 355 in receive server 350 via the one-way data link comprising transmit application 102, diode 103, optical link 104, photodetector 112 and receive application 112. MB listen module 355 then makes the information received available to clients via a remote network 390 based upon the configuration file in receive server 350. In the embodiment shown in FIG. 4, for example, a remote client 440 includes a data injection application 442 which communicates with the MB listen module 355 to read such information and store it within remote database 445. Notably, remote client 440 is able to access information obtained from secure network 230 but without any ability to otherwise communicate to such network. This ensures the security of network 230 and prevents any disruption thereto.

FIG. 5 shows an implementation 500 based only on the second mode of operation. In FIG. 5, a MODBUS PLC 510 is directly coupled to send server 520 via a local network 230. Send server 520 and PLC 510 are within a secure area (e.g., a high integrity control network) shown in FIG. 5 as the area to the right of dotted line 360. The area to the left of dotted line 360 is considered the remote portion outside the secure area. Send server 520 includes a configuration file enabling MB read module 315. As discussed above and based upon the polling records defined in the configuration file, MB read module 315 polls each defined PLC device (PLC 510 in FIG. 5) and immediately sends the information obtained to the MB listen module 355 in the receive server 350 via the one-way data link comprising transmit application 102, diode 103, optical link 104, photodetector 112 and receive application 112. MB listen module 355 then makes the information received available to client 440 via a remote network 390 based upon the configuration file in receive server 350 in the same way as in the embodiment of FIG. 4. This configuration also provides remote client 440 with access to information obtained from secure network 230 but does not allow remote client 440 with any ability to otherwise communicate to such network.

Although the present invention has been particularly shown and described with reference to the preferred embodiments and various aspects thereof, it will be appreciated by those of ordinary skill in the art that various changes and modifications may be made without departing from the spirit and scope of the invention. It is intended that the appended claims be interpreted as including the embodiments described herein, the alternatives mentioned above, and all equivalents thereto.

What is claimed is:

1. A system for securely transferring information from a first network positioned within a secure domain, comprising:
one or more remote terminal units within the secure domain;
a first network within the secure domain coupling the one or more remote terminal units;
one or more client computers within the secure domain;
a second network within the secure domain coupling the one or more client computers;
a send server within the secure domain and directly coupled to the first network and to the second network, the send server having an output and configured to act as a proxy for communications between at least one of the one or more client computers and at least one of the one or more remote terminal units, to store first information provided by the at least one of the one or more remote terminal units, and to transmit the stored first information on the output, the send server also configured to transmit a poll request based on information stored in the send server to at least one of the one or more remote terminal units via the first network, to store second information supplied on the first network in response to the poll request, and to transmit the second information on the output;
a receive server outside the secure domain having an input coupled to the output of the send server only via a one-way data link which allows communication only from the send server to the receive server and which prevents any communication from the receive server to the send server, the receive server configured to receive and store the first and second information provided via the input, the receive server coupled to the send server only via the one-way data link;
a third network outside the secure domain coupled to the receive server;
one or more client computers outside the secure domain coupled to the third network;
wherein the receive server is configured to provide at least part of the stored information in response to a request from one of the one or more client computers via the third network; and
wherein at least one of the remote terminal units is a MODBUS device.

2. The system of claim 1, wherein at least one of the remote terminal units is a MODBUS PLC.

3. The system of claim 1, wherein the first and second networks are part of an industrial control system.

4. A system for securely transferring information from a first network positioned within a secure domain, comprising:
one or more remote terminal units within the secure domain;
a first network within the secure domain coupling the one or more remote terminal units;
one or more client computers within the secure domain;
a second network within the secure domain coupling the one or more client computers;
a send server within the secure domain and directly coupled to the first network and to the second network, the send server having an output and configured to act as a proxy for communications between at least one of the one or more client computers and at least one of the one or more remote terminal units, to store information provided by the at least one of the one or more remote terminal units, and to transmit the stored information on the output;
a receive server outside the secure domain having an input coupled to the output of the send server only via a one-way data link which allows communication only from the send server to the receive server and which prevents any communication from the receive server to the send server, the receive server configured to receive and store the information provided via the input, the receive server coupled to the send server only via the one-way data link;
a third network outside the secure domain coupled to the receive server;
one or more client computers outside the secure domain coupled to the third network; and wherein the receive server is configured to provide at least part of the stored information in response to a request from one of the one or more client computers via the third network and wherein at least one of the remote terminal units is a MODBUS device.

5. The system of claim 4, wherein at least one of the remote terminal units is a MODBUS PLC.

6. The system of claim 4, wherein the first and second networks are part of an industrial control system.

7. A system for securely transferring information from a first network positioned within a secure domain, comprising:
one or more remote terminal units within the secure domain;
a first network within the secure domain coupling the one or more remote terminal units;
a send server within the secure domain and directly coupled to the first network, the send server having an output and configured to transmit a poll request based on information stored in the send server to at least one of the one or more remote terminal units via the first network, to read information supplied on the first network in response to the poll request, and to transmit the read information on the output;
a receive server outside the secure domain having an input coupled to the output of the send server only via a one-way data link which allows communication only from the send server to the receive server and which prevents any communication from the receive server to the send server, the receive server configured to receive and store the information provided via the input, the receive server coupled to the send server only via the one-way data link;
a second network outside the secure domain coupled to the receive server;
one or more client computers outside the secure domain coupled to the second network; and
wherein the receive server is configured to provide at least part of the stored information in response to a request from one of the one or more client computers via the second network and
wherein at least one of the remote terminal units is a MODBUS device.

8. The system of claim 7, wherein at least one of the remote terminal units is a MODBUS PLC.

9. The system of claim 7, wherein the first network is part of an industrial control system.

* * * * *